United States Patent
Choi et al.

(10) Patent No.: US 7,336,951 B2
(45) Date of Patent: Feb. 26, 2008

(54) SYSTEM AND METHOD FOR PERFORMING HANDOVER IN MOBILE COMMUNICATION SYSTEM USING PAGING PROCEDURE

(75) Inventors: Jae-Am Choi, Yongin-si (KR); Sung-Bum Kim, Seongnam-si (KR); Chan-Byoung Chae, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 197 days.

(21) Appl. No.: 10/785,225

(22) Filed: Feb. 25, 2004

(65) Prior Publication Data

US 2004/0180660 A1   Sep. 16, 2004

(30) Foreign Application Priority Data

Feb. 26, 2003   (KR) .................... 10-2003-0012050

(51) Int. Cl.
*H04Q 7/20*   (2006.01)
(52) U.S. Cl. ................ 455/436; 455/432.1; 455/432.2; 455/439; 370/331
(58) Field of Classification Search ............ 455/432.1, 455/436–439, 442, 443, 444, 432.2; 370/328, 370/331
See application file for complete search history.

(56) References Cited

U.S. PATENT DOCUMENTS

| | | | | |
|---|---|---|---|---|
| 6,108,322 | A * | 8/2000 | Kotzin et al. | 370/333 |
| 6,542,744 | B1 * | 4/2003 | Lin | 455/437 |
| 6,681,111 | B2 * | 1/2004 | Ahn et al. | 455/432.2 |
| 2002/0187804 | A1 * | 12/2002 | Narasimha et al. | 455/552 |
| 2003/0114155 | A1 * | 6/2003 | Jain et al. | 455/432 |
| 2003/0129981 | A1 * | 7/2003 | Kim | 455/436 |
| 2004/0137903 | A1 * | 7/2004 | Park | 455/436 |

(Continued)

*Primary Examiner*—Duc M. Nguyen
*Assistant Examiner*—Anthony S. Addy
(74) *Attorney, Agent, or Firm*—Roylance, Abrams, Berdo & Goodman, L.L.P.

(57) ABSTRACT

A system and method for handing over a terminal from a first base station to a second base station in a mobile communication system while the terminal is in communication with the first base station. Upon determining that the terminal must hand over to the second base station while communicating with the first base station in a first communication mode, a first base station controller controls the terminal such that it performs an initialization operation based on a second communication mode with the second base station. The first base station controller then notifies a first mobile switching center that the terminal has completed the initialization operation. The first mobile switching center notifies a second mobile switching center via a roaming gateway that the terminal must hand over to the second base station. The second mobile switching center controls a second base station controller such that it pages the terminal. If the second base station controller completes the paging of the terminal, the second mobile switching center notifies the first mobile switching center via the roaming gateway that the terminal is ready to hand over to the second base station. The roaming gateway controls the second mobile switching center such that the second base station controller sets up a call with the terminal. The second mobile switching center then notifies the first mobile switching center via the roaming gateway that the call setup with the terminal has been completed. The first mobile switching center controls the first base station controller such that it releases current communication of the terminal with the first base station.

14 Claims, 8 Drawing Sheets

U.S. PATENT DOCUMENTS

2004/0156329 A1* 8/2004 Bck et al. .................. 370/328
2005/0128980 A1* 6/2005 Han et al. .................. 370/331
2005/0159158 A1* 7/2005 Pardeep et al. ............. 455/436

* cited by examiner

SYSTEM AND METHOD FOR PERFORMING HANDOVER IN MOBILE COMMUNICATION SYSTEM USING PAGING PROCEDURE

PRIORITY

This application claims priority to an application entitled "SYSTEM AND METHOD FOR PERFORMING HANDOVER IN MOBILE COMMUNICATION SYSTEM USING PAGING PROCEDURE", filed in the Korean Intellectual Property Office on Feb. 26, 2003 and assigned Serial No. 2003-12050, the contents of which are hereby incorporated by reference.

BACKGROUND OF THE INVENTION

1. Field of the Invention

The present invention relates to a mobile communication system, and more particularly, to a system and method for performing a handover between networks with different communication modes.

2. Description of the Related Art

With the advance of modem society, mobile communication systems have made rapid technical progress and their services have been provided in various communication modes. In order to provide mobile communication services in various communication modes, a new mobile communication mode does not replace an existing one abruptly, but initially operates in a limited manner in a network used for demonstration purposes only (i.e., a local network including mobile communication system equipment for replacing an existing one to support the new mobile communication mode). While operating in this mode, when a user terminal moves out of the demonstration operation network while receiving a communication service in the new mobile communication mode, it can be continuously provided with the communication service only in the case when a handover can be performed between the network employing the new mobile communication mode and an existing mobile communication network employing the existing mobile communication mode. If a handover cannot be performed between the network employing the new mobile communication mode and the existing mobile communication network, the communication service being provided to the user terminal will be interrupted and will not be able to be provided.

A brief description will hereinafter be given of the structures of the network employing the new mobile communication mode and the network employing the existing mobile communication mode with reference to FIG. 1. FIG. 1 shows the construction of a general mobile communication system, wherein the new mobile communication mode is assumed to be a wide-band code division multiple access (referred to hereinafter as "WCDMA") mode, which is a 3rd generation (3G) mobile communication mode. The existing mobile communication mode is assumed to be a code division multiple access (referred to hereinafter as "CDMA") mode, which is a 2nd generation (2G) mobile communication mode.

FIG. 1 schematically shows the construction of the general mobile communication system.

With reference to FIG. 1, on the assumption that the new mobile communication mode is the WCDMA mode and the existing mobile communication mode is the CDMA mode, as stated above, the network employing the WCDMA mode (referred to hereinafter as "WCDMA network"), denoted by the reference numeral 100. Network 100 includes a user terminal (referred to hereinafter as "WCDMA user terminal") 111 for receiving a communication service in the WCDMA mode, a node B 113 (i.e., a 3G base station), a radio network controller (RNC) 115, and a universal mobile telecommunications system (UMTS) mobile switching center (referred to hereinafter as "UMSC") 117. The RNC 115 is connected with a core network (CN, not shown) to perform all processes associated with connections of the WCDMA user terminal 111. The RNC 115 also acts to allocate radio resources to the WCDMA user terminal 111 when it is connected with the node B 113. The node B 113 acts to allocate channels to the WCDMA user terminal 111 on an actual physical layer.

The network employing the CDMA mode (referred to hereinafter as "CDMA network"), is denoted by the reference numeral 150. Network 150 includes a user terminal (referred to hereinafter as "CDMA user terminal") 151 for receiving a communication service in the CDMA mode, a base transceiver subsystem (BTS) 153, a base station controller (BSC) 155, and a mobile switching center (MSC) 157. The BTS 153, BSC 155 and MSC 157 perform the same functions as those of the node B 113, RNC 115 and UMSC 117, respectively, only with the exception that the service mode is the CDMA mode, not the WCDMA mode, and a detailed description thereof will thus be omitted.

In the mobile communication system with the construction described above, the WCDMA user terminal 111 may approach the service area of the CDMA network 150 while receiving communication services in the service area of the WCDMA network 100. In this case, a handover must be performed between the WCDMA network 100 and the CDMA network 150. However, the different communication modes of the WCDMA network 100 and CDMA network 150 make it impossible for the WCDMA user terminal 111 to hand over to the CDMA network 150, although it will attempt the handover.

Therefore, in order to support a handover from a WCDMA mode-based communication system (or a 3G mobile communication system), to a CDMA mode-based communication system (or a 2G mobile communication system), accurate consideration must be taken into account for parameters essential to the WCDMA mode-based communication system and parameters essential to the CDMA mode-based communication system. Further, in order to support the handover from the WCDMA mode-based communication system to the CDMA mode-based communication system, the currently defined air-interface standard cannot be subjected to any variation, which would make it impossible to perform the handover from the WCDMA mode-based communication system to the CDMA mode-based communication system.

SUMMARY OF THE INVENTION

Therefore, the present invention having been made in view of the problems described above, and it is an object of the present invention to provide a system and method for performing a handover between networks with different communication modes.

It is another object of the present invention to provide a system and method for performing a handover in a mobile communication system using an inter-system paging procedure.

In accordance with one aspect of the present invention, the above and other objects can be accomplished by a system for handing over a terminal from a first base station to a second base station in a mobile communication system while the terminal is in communication with the first base station. The first base station provides a communication service in a first communication mode, and the second base station provides a communication service in a second communication mode. The second communication mode is different from the first communication mode. The system comprises a first base station controller for controlling the terminal upon determining that the terminal must hand over to the second base station, such that it performs an initialization operation based on the second communication mode with the second base station. The base station controller further notifies a first mobile switching center that the terminal has completed the second communication mode-based initialization operation, upon recognizing that the terminal has completed the second communication mode-based initialization operation, and then releases a call currently set up with the terminal if the terminal hands over to the second base station. The first mobile switching center of the system notifies a second mobile switching center to which the second base station belongs, via a roaming gateway, that the terminal must hand over to the second base station, upon recognizing that the terminal has completed the second communication mode-based initialization operation. The mobile switching center then controls the first base station controller such that it releases the call currently set up with the terminal, upon recognizing that the terminal is ready to hand over to the second base station. The second mobile switching center of the system controls a second base station controller to which the second base station is connected if it is notified that the terminal must hand over to the second base station. The second mobile switching center will then page the terminal, notifying the first mobile switching center via the roaming gateway that the terminal is ready to hand over to the second base station, upon recognizing that the second base station controller has completed the paging of the terminal, and then notifies the first mobile switching center via the roaming gateway that a second communication mode-based call setup with the terminal has been completed, upon recognizing that the second base station controller has completed the call setup with the terminal according to a predetermined control. The second base station controller of the system pages the terminal under the control of the second mobile switching center and performs the call setup with the terminal after completing the paging of the terminal. The roaming gateway of the system performs a standard conversion operation with respect to messages transmitted and received between the first mobile switching center and the second mobile switching center.

In accordance with another aspect of the present invention, there is provided a method for handing over a terminal from a first base station to a second base station in a mobile communication system, while the terminal is in communication with the first base station, wherein the mobile communication system (system) includes a first base station for providing a communication service in a first communication mode, and a first base station controller connected with the first base station and a first mobile switching center. The system further includes a second base station for providing a communication service in a second communication mode, the second communication mode being different from the first communication mode, a second base station controller connected with the second base station and a second mobile switching center, and a roaming gateway for performing a standard conversion operation with respect to messages transmitted and received between the first mobile switching center and the second mobile switching center. The method comprises controlling the terminal by the first base station controller such that it performs an initialization operation based on the second communication mode with the second base station, upon determining that the terminal must hand over to the second base station and also notifying the first mobile switching center that the terminal has completed the second communication mode-based initialization operation, if the terminal completes the second communication mode-based initialization operation with the second base station. The method further comprises notifying the second mobile switching center by the first mobile switching center via the roaming gateway that the terminal must hand over to the second base station and controlling the second base station controller by the second mobile switching center such that it pages the terminal. The method also comprises notifying the first mobile switching center by the second mobile switching center via the roaming gateway, that the terminal is ready to hand over to the second base station, upon recognizing that the second base station controller has completed the paging of the terminal and controlling the second mobile switching center by the roaming gateway such that the second base station controller sets up a call with the terminal, as the terminal is ready to hand over to the second base station. The method still further comprises notifying the first mobile switching center by the second mobile switching center via the roaming gateway that the call setup with the terminal has been completed, upon recognizing that the second base station controller has completed the call setup with the terminal, and controlling the first base station controller by the first mobile switching center such that it releases current communication of the terminal with the first base station, as the call setup with the terminal is completed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Certain embodiments of the present invention will be described in detail with reference to the annexed drawings. In the following description, a detailed description of known functions and configurations incorporated herein will be omitted when it may make the subject matter of the present invention rather unclear.

Figure 1:
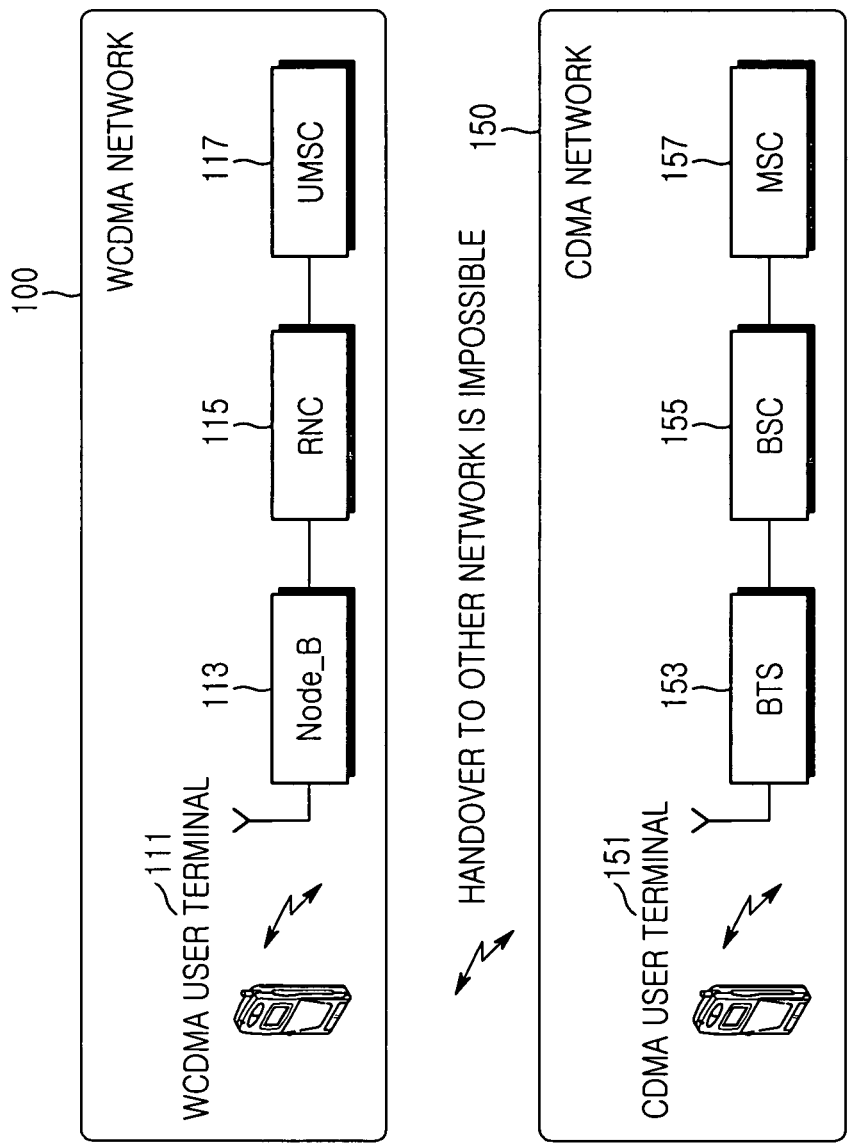
FIG. 1 is a block diagram schematically showing the construction of a general mobile communication system.
Figure 2:
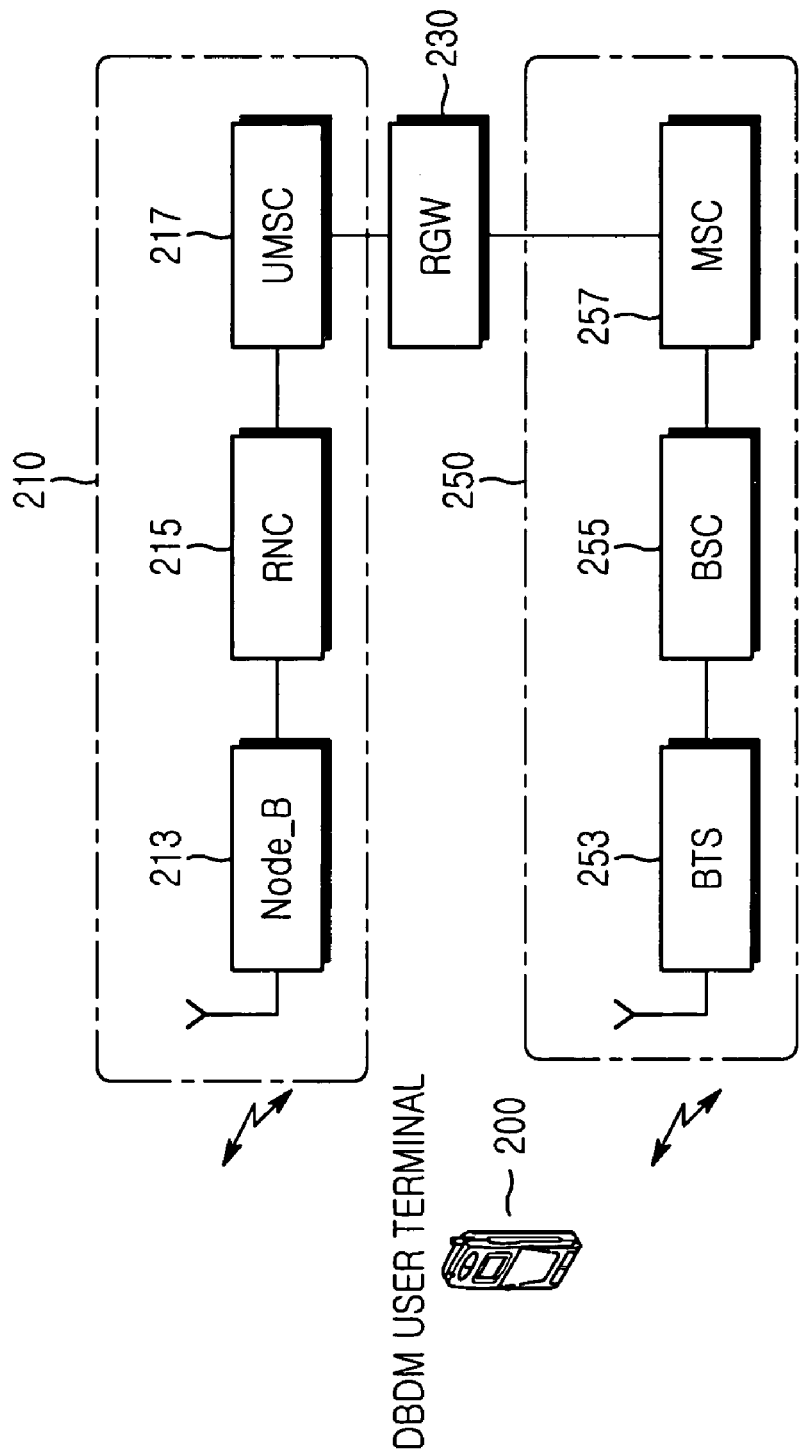
FIG. 2 is a block diagram schematically showing the construction of a mobile communication system for performing a handover function according to a preferred embodiment of the present invention.

With reference to FIG. 2, there is schematically shown in block form the construction of a mobile communication system for performing a handover function according to a preferred embodiment of the present invention.

As shown in FIG. 2, the mobile communication system comprises a dual-band dual-mode (DBDM) user terminal 200 for supporting both a wide-band code division multiple access (referred to hereinafter as "WCDMA") mode, which is a 3rd generation (3G) mobile communication mode, and a code division multiple access (referred to hereinafter as "CDMA") mode, which is a 2nd generation (2G) mobile communication mode. The DBDM user terminal 200 can process signals transmitted and received to/from both a communication system employing the WCDMA mode and a communication system employing the CDMA mode. In an embodiment of the present invention, the WCDMA mode-based communication system is a European asynchronous communication system, such as a universal mobile telecommunications system (referred to hereinafter as "UMTS"). The structure of the DBDM user terminal 200 will be described below in greater detail with reference to FIG. 3.

The mobile communication system further comprises a network 210 for providing a communication service in the WCDMA mode, which will hereinafter be referred to as a WCDMA network. The WCDMA network 210 includes a node B 213, a radio network controller (RNC) 215, and a UMTS mobile switching center (referred to hereinafter as "UMSC") 217. The RNC 215 is connected with a core network (CN, not shown) to perform all processes associated with connections of WCDMA user terminals. The RNC 215 also acts to allocate radio resources to the WCDMA user terminals when they are connected with the node B 213. Here, the WCDMA user terminals signify user terminals capable of communicating in the WCDMA mode. The node B 213 acts to allocate. channels to the WCDMA user terminals on an actual physical layer. The UMSC 217 is connected with a roaming gateway (RGW) 230.

The mobile communication system further comprises a network 250 for providing a communication service in the CDMA mode, which will hereinafter be referred to as a CDMA network. The CDMA network 250 includes a base transceiver subsystem (BTS) 253, a base station controller (BSC) 255, and a mobile switching center (MSC) 257. The BTS 253, BSC 255 and MSC 257 perform the same functions as those of the node B 213, RNC 215 and UMSC 217, respectively, only with the exception that the service mode is the CDMA mode, not the WCDMA mode, and a detailed description thereof will thus be omitted. The MSC 257 is connected with the RGW 230.

The RGW 230 is connected between the UMSC 217 and the MSC 257 to map the standards of messages transmitted and received between the WCDMA network 210 and the CDMA network 250. The RGW 230 is adapted to perform mapping between a mobile application part (referred to hereinafter as "MAP") of the WCDMA network 210 and a MAP of the CDMA network 250. It should be noted that the WCDMA network 210 will hereinafter be described also as a UMTS network and the WCDMA network 210 and the UMTS network are the same. The RGW 230 is also adapted to map an integrated services digital network (ISDN) user part (referred to hereinafter as "ISUP") standard message to the MAP standard of the UMTS network 210 or the MAP standard of the CDMA network 250. In this manner, the RGW 230 enables transmission and reception of messages between systems communicating using different radio access technologies (referred to hereinafter as "RATs"). In this regard, the RGW 230 enables a handover between the WCDMA network 210 and the CDMA network 250 using an inter-system paging procedure, as will be described below in greater detail.

The internal structure of the DBDM user terminal 200 will now be described in greater detail with reference to FIG. 3.

Figure 3:
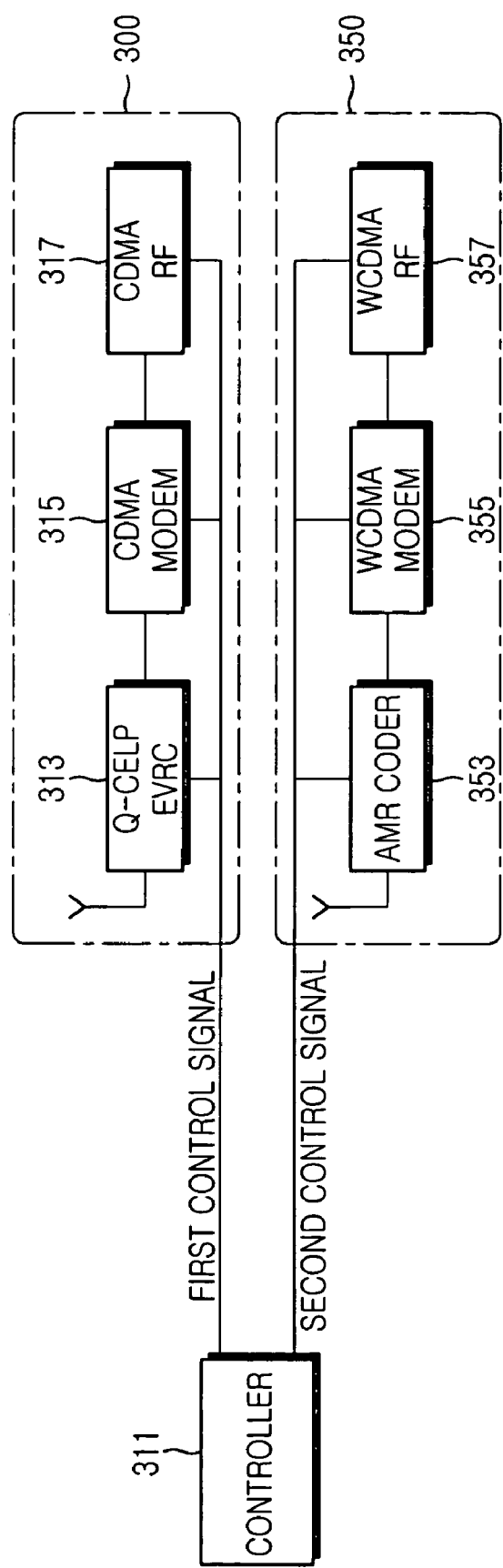
FIG. 3 is a block diagram showing the internal structure of a dual-mode user terminal for performing the handover function according to an embodiment of the present invention.

FIG. 3 is a block diagram showing the internal structure of the DBDM user terminal for performing the handover function according to the embodiment of the present invention.

With reference to FIG. 3, the DBDM user terminal 200 includes a controller 311, a CDMA mode processor 300 and a WCDMA mode processor 350. The controller 311 is adapted to control the entire operation of the DBDM user terminal 200. In particular, the controller 311 controls the power supply for a signal process based on a communication mode in which the DBDM user terminal 200 operates, namely, the WCDMA mode or CDMA mode.

The CDMA mode processor 300 includes a Qualcomm code excited linear prediction enhanced variable rate coder (Q-CELP EVRC) 313, a CDMA modem 315 and a CDMA radio frequency (RF) processor 317. The Q-CELP EVRC 313 codes input/output data in a Q-CELP EVRC manner. The CDMA modem 315 modulates data to be transmitted in a modulation manner corresponding to the CDMA mode, and demodulates received data in a demodulation manner corresponding to the CDMA mode. The CDMA RF processor 317 down-converts an RF signal received over the air, or up-converts data to be transmitted into an RF signal and transmits the up-converted RF signal over the air.

The WCDMA mode processor 350 includes an adaptive multi-rate (AMR) coder 353, a WCDMA modem 355 and a WCDMA RF processor 357. The AMR coder 353 codes input/output data in an AMR coding manner. The WCDMA modem 355 modulates data to be transmitted in a modulation manner corresponding to the WCDMA mode and demodulates received data in a demodulation manner corresponding to the WCDMA mode. The WCDMA RF processor 357 down-converts an RF signal received over the air, or up-converts data to be transmitted into an RF signal and transmits the up-converted RF signal over the air.

Figure 4A:
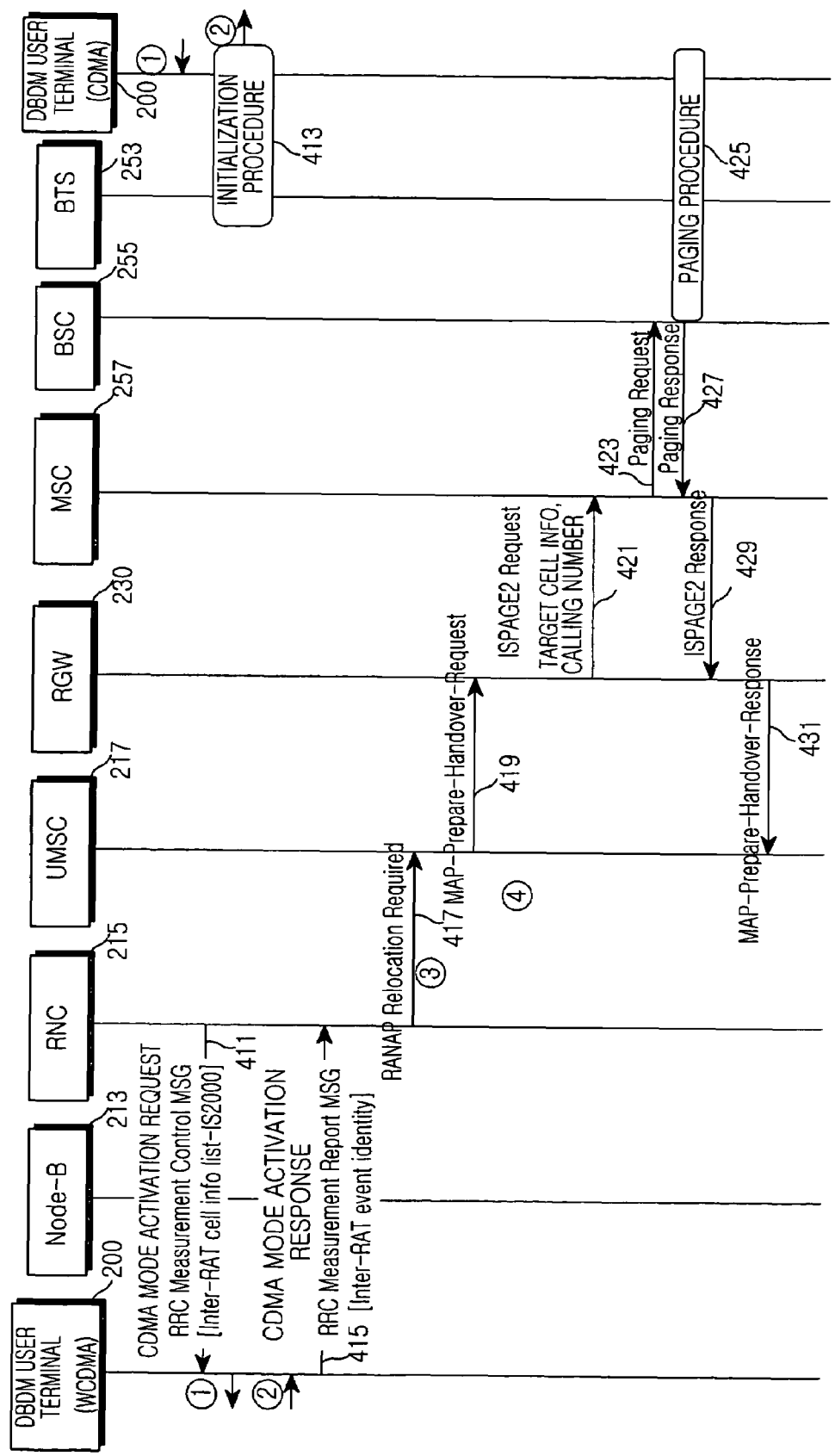
FIGS. 4a and 4b are flow charts illustrating a procedure of performing a handover from a 3G communication network to a 2G communication network according to an embodiment of the present invention.
Figure 4B:
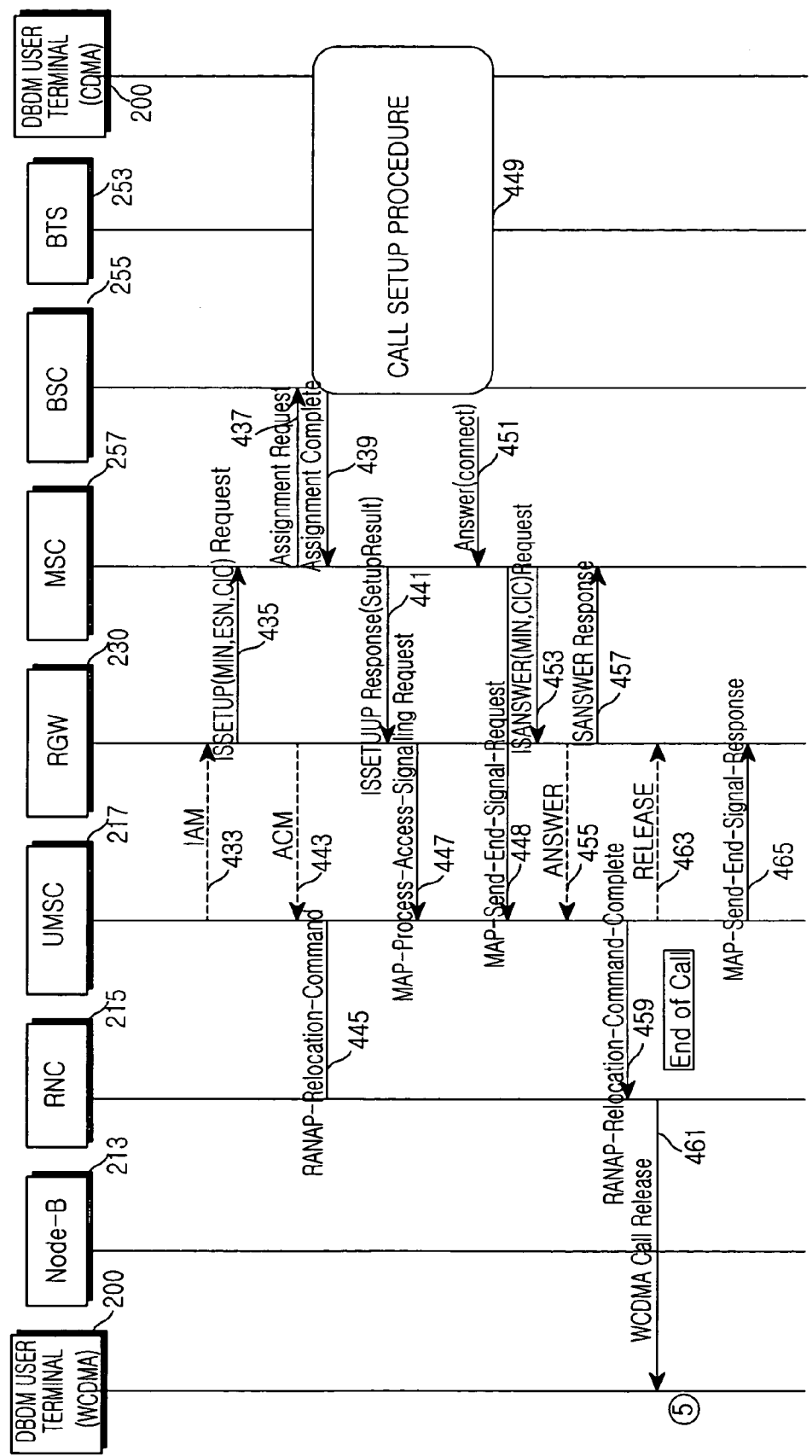

A description will now be provided of a procedure for performing a handover from the 3G communication network, (WCDMA network 210), to the 2G communication network (CDMA network 250), with reference to FIGS. 4a and 4b.

FIGS. 4a and 4b are flow charts illustrating the procedure of handing over from the 3G communication network to the 2G communication network according to an embodiment of the present invention.

Although two DBDM user terminals are shown in FIGS. 4a and 4b for the convenience of description, they are substantially the same. One terminal is given for description of the case where the DBDM user terminal 200 communicates in the WCDMA mode and the other terminal is given for description of the case where the DBDM user terminal 200 communicates in the CDMA mode. As a result, a "DBDM user terminal (WCDMA)" is the DBDM user terminal 200 when it communicates in the WCDMA mode, and a "DBDM user terminal (CDMA)" is the DBDM user terminal 200 when it communicates in the CDMA mode.

When the DBDM user terminal (WCDMA) 200 communicates in the 3G communication mode, or WCDMA mode, the controller 311 supplies power to only the WCDMA mode processor 350 to perform the communication in the WCDMA mode. The controller 311 continuously monitors neighbor cell information while performing the communication in the WCDMA mode. In an embodiment of the present invention, the number of cells whose information is monitored as the neighbor cell information is assumed to be six. While monitoring the neighbor cell information, the controller 311 determines whether the neighbor cell information is insufficient, for the reasons described below.

Since the DBDM user terminal (WCDMA) 200 currently communicates in the WCDMA mode, the controller 311 can recognize as neighbor cells only those cells that provide communication services in the WCDMA mode. Where an arbitrary cell does not provide a communication service in the WCDMA mode, it is impossible for the controller 311 to recognize the arbitrary cell as a neighbor cell. Thus, it is impossible for the DBDM user terminal (WCDMA) 200 to normally demodulate a signal transmitted from a cell which provides a communication service in any communication mode other than the WCDMA mode, for example, the CDMA mode. For this reason, even though the cell communicating in the CDMA mode actually exists as a neighbor cell with respect to the DBDM user terminal (WCDMA) 200, it cannot be recognized as a neighbor cell by the DBDM user terminal (WCDMA) 200. If neighboring cell information is such that there is present only information regarding four neighboring cells (i.e., "insufficient" information), the controller 311 determines that the DBDM user terminal (WCDMA) 200 is located in the vicinity of the boundaries of a region where there exist cells using a radio access mode different from the WCDMA mode (e.g., the CDMA mode). The DBDM user terminal (WCDMA) 200 periodically sends the neighbor cell information to the RNC 215. Because the neighbor cell information sent from the DBDM user terminal (WCDMA) 200 is insufficient, the RNC 215 determines that the DBDM user terminal (WCDMA) 200 must hand over to the CDMA network 250. The RNC 215 then performs a CDMA mode activation request procedure to request the DBDM user terminal (WCDMA) 200 to activate the CDMA mode (step 411).

The CDMA mode activation request procedure is carried out with a radio resource control (referred to hereinafter as "RRC") measurement control message in step 411. The RRC measurement control message has a plurality of information elements (referred to hereinafter as "IEs"). The RRC measurement control message is a message being currently used in the WCDMA network 210. In an embodiment of the present invention, an IS 2000 IE in an Inter-RAT cell info list IE in an Inter-RAT Measurement IE, among the IEs of the RRC measurement control message, is used for the CDMA mode activation request. In the WCDMA communication system, the IS 2000 IE of the RRC measurement control message is a reserved field. In an embodiment of the present invention, a predetermined value, for example, "1" is recorded in the IS 2000 IE to indicate that the RRC measurement control message is used for the CDMA mode activation request. If "1" is not recorded in the IS 2000 IE, the RRC measurement control message will be determined to be a general RRC measurement control message of the WCDMA communication system.

Upon receiving the RRC measurement control message from the RNC 215, the DBDM user terminal (WCDMA) 200 recognizes that the CDMA mode must be activated, since the IS 2000 IE of the RRC measurement control message is recorded with "1". As a result, the DBDM user terminal (WCDMA) 200 powers on the CDMA processor 300 to perform a hand over to the CDMA network 250.

Then, the CDMA processor 300 in the DBDM user terminal (CDMA) 200 performs a general CDMA initialization procedure (step 413). In an embodiment of the present invention, the CDMA initialization procedure signifies a synchronization acquisition procedure carried out just after the DBDM user terminal (CDMA) 200 is powered on. If the DBDM user terminal (CDMA) 200 completes the initialization procedure with the CDMA network 250, then the DBDM user terminal (WCDMA) 200 performs a CDMA mode activation response procedure to report to the RNC 215 that the CDMA mode has been activated (step 415). In an embodiment of the present invention, the CDMA mode activation response procedure is carried out with an RRC measurement report message. The RRC measurement report message is a message being currently used in the WCDMA network 210. In an embodiment of the present invention, an Inter-RAT event identity IE in an Inter-RAT measurement event results IE in an event results IE, among the plurality of IEs of the RRC measurement report message, is used for the CDMA mode activation response. A portion of the Inter-RAT event identity IE of the RRC measurement report message is a reserved field. A predetermined value, for example, "1" is recorded in the reserved field of the Inter-RAT event identity IE to indicate that the RRC measurement report message is used for the CDMA mode activation response. If a "1" is not recorded in the reserved field of the Inter-RAT event identity IE, the RRC measurement report message will be determined to be a general RRC measurement report message of the WCDMA communication system.

If the RNC 215 receives the RRC measurement report message from the DBDM user terminal (WCDMA) 200, it recognizes that the DBDM user terminal (WCDMA) 200 has completed the activation of the CDMA mode. Therefore it is ready to operate in the CDMA mode. As a result, the RNC 215 reports the CDMA mode activation completed state of the DBDM user terminal (WCDMA) 200 to the UMSC 217, which is a core network (CN), using a radio access network application part (referred to hereinafter as "RANAP") relocation required message (step 417). In an embodiment of the present invention, the RANAP relocation required message is a message being currently used in the WCDMA network 210. Among the plurality of EIs of the RANAP relocation required message, a Target ID IE is used to indicate that the DBDM user terminal (WCDMA) 200 is in the CDMA mode activation state. A predetermined value, for example, "1" is recorded in the Target ID IE of the RANAP relocation required message to indicate that the RANAP relocation required message is used to report the CDMA mode activation completed state of the DBDM user terminal (WCDMA) 200. If "1" is not recorded in the Target ID IE of the RANAP relocation required message, the RANAP relocation required message will be determined to be a general RANAP relocation required message of the WCDMA communication system.

Upon receiving the RANAP relocation required message, the UMSC 217 sends a MAP-prepare-handover request message to the RGW 230 (step 419). In an embodiment of the present invention, a MAP-prepare-handover service signifies a service of handing over or relocating a call between a first MSC and second, arbitrary, MSC. The MAP-prepare-handover request message is sent to provide the MAP-prepare-handover service, namely, to hand over the DBDM user terminal (WCDMA) 200 to the CDMA network 250. The format of the MAP-prepare-handover request message will hereinafter be described with reference to the following table 1.

TABLE I

| Parameter name | Request |
| --- | --- |
| Invoke Id | 0 |
| Target RNC Id | 0 |
| Target Cell Id | 0 |
| IMSI | M |
| HO-NumberNotRequired | 0 |
| Encyption InformationIntegrity | 0 |
| Protection Information | 0 |

As seen from the above Table I, the MAP-prepare-handover request message includes a plurality of parameters. In an embodiment of the present invention, only the international mobile subscriber identity (referred to hereinafter as "IMSI"), from among the parameters of the MAP-prepare-handover request message, is set as a mandatory parameter. The IMSI is composed of a combination of a mobile country code (referred to hereinafter as "MCC"), a mobile network code (referred to hereinafter as "MNC") and a mobile identification number (referred to hereinafter as "MIN"). Among the parameters of the MAP-prepare-handover request message, a target RNC identity (referred to hereinafter as "target RNC id") is used to represent a base station controller to which the DBDM user terminal (WCDMA) 200 is to hand over, and a target cell identity (referred to hereinafter as "Target Cell id") is used to represent a cell, or base transceiver subsystem, to which the DBDM user terminal (WCDMA) 200 is to hand over.

If the RGW 230 receives the MAP-prepare-handover request message, then it detects the target RNC id and target cell id from the received message and identifies a mobile switching center to which the base station controller corresponding to the detected target RNC id belongs. Here, the base station controller identified on the basis of the MAP-prepare-handover request message is the BSC 255. As a result, the RGW 230 sends an inter-system page 2 (referred to hereinafter as "ISPAGE2") request message to the MSC 257 (step 421). At this time, the RGW 230 performs a mapping operation with respect to signals transferred according to the UMTS map standard, such that they are conformable to the CDMA MAP standard. The CDMA MAP standard, can be, for example, an IS-41C/D standard. The structure of a MAP conversion protocol stack for mapping between the UMTS map standard and the CDMA MAP standard will hereinafter be described with reference to FIG. 5.

Figure 5:
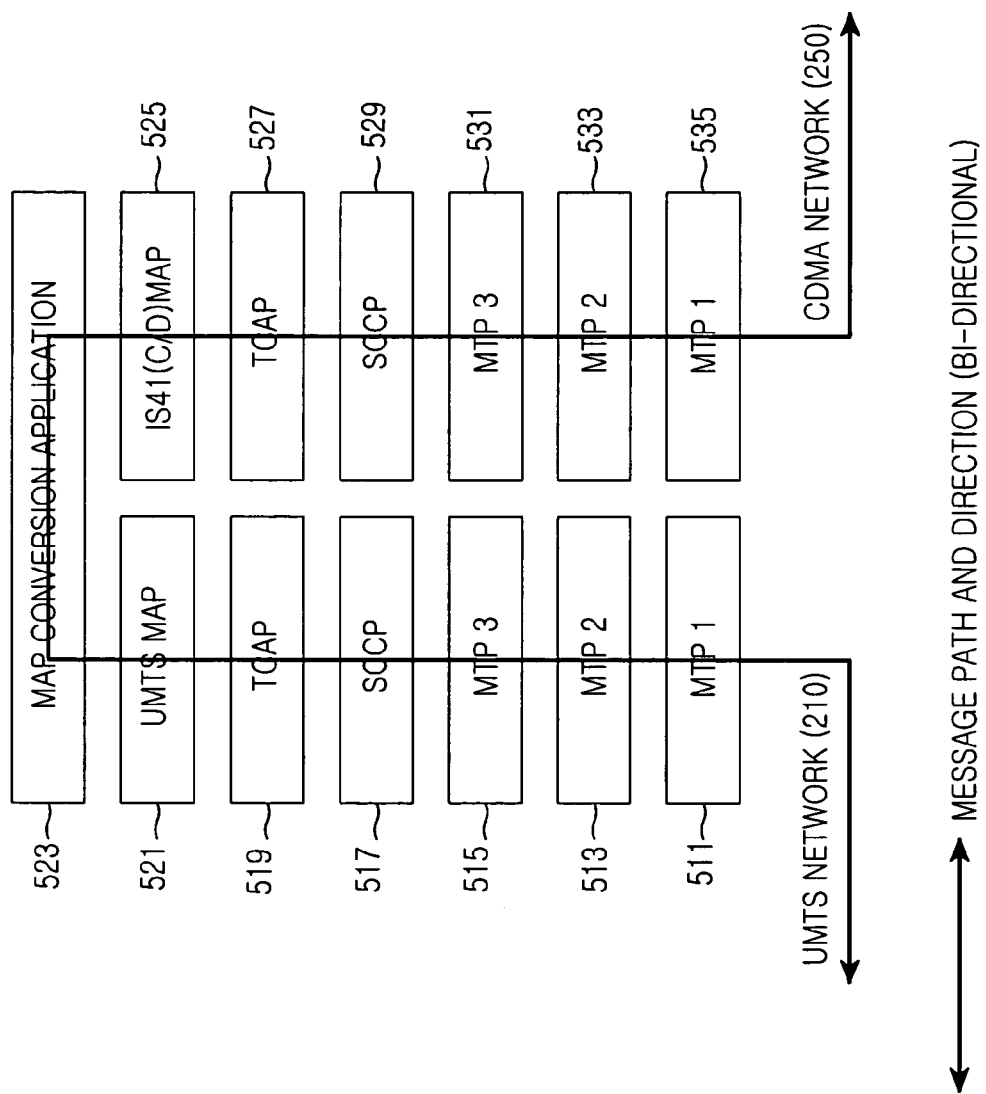
FIG. 5 is a block diagram schematically showing the structure of a UMTS MAP/CDMA MAP standard conversion protocol stack of a roaming gateway in FIG. 2.

FIG. 5 is a block diagram schematically showing the structure of the MAP conversion protocol stack for conversion between the UMTS MAP standard and CDMA MAP standard in the roaming gateway 230 in FIG. 2.

With reference to FIG. 5, an incoming signal from the UMTS network 210 is first transferred to a message transfer part (referred to hereinafter as "MTP") 1 511. The MTP is a protocol layer of a signaling system 7 (referred to hereinafter as "SS7") having three levels, an MTP 1, MTP 2 and MTP 3. The MTP 1 511 is a layer defining physical, electrical and functional characteristics of a digital signaling link. The signal transferred to the MTP 1 511 is then transferred to a signaling connection control part (referred to hereinafter as "SCCP") 517 via MTP 2 513 and MTP 3 515. Here, the MTP 2 513 is an SS7 data link protocol layer, which acts to control the flow of input/output signals thereof and perform message sequence validation, error checking and retransmission with respect to input/output messages thereof. The MTP 3 515 transmits and receives messages between signaling points in the SS7 network and supports a traffic control when message congestion or failure occurs. The SCCP 517 can carry out routing and data transmission without any logical signaling connection. The SCCP 517 transfers the signal from the MTP 3 515 to a transaction capability application part (referred to hereinafter as "TCAP") 519. Here, the TCAP 519 acts to transmit and receive information between applications using non-circuit related signals in a PCS. The TCAP 519 transfers the signal from the SCCP 517 to a UMTS MAP 521, which then transfers the signal from the TCAP 519 to a MAP conversion application 523. The MAP conversion application 523 maps the signal transferred from the UMTS MAP 521 so that it is conformable to the CDMA MAP standard, and then transfers the resulting signal to an IS41(C/D) MAP 525. In an embodiment of the present invention, the MAP conversion procedure of the MAP conversion application 523 includes detecting a message of the CDMA network 250 corresponding to a message transferred from the UMTS network 210 and inserting specific parameters in the detected message of the CDMA network 250. The operation of the MAP conversion application 523 will be described below in greater detail.

The IS41(C/D) MAP 525 transfers the signal from the MAP conversion application 523 to a TCAP 527, which then transfers the signal from the IS41(C/D) MAP 525 to an SCCP 529. The SCCP 529 transfers the signal from the TCAP 527 to an MTP 3 531, which then transfers the signal from the SCCP 529 to an MTP 2 533. The MTP 2 533 transfers the signal from the MTP 3 531 to an MTP 1 535, which then transfers the signal from the MTP 2 533 to the CDMA network 250. In an embodiment of the present invention, the mapping between the UMTS MAP standard and the CDMA MAP standard is carried out by the MAP conversion application 523. The MAP conversion application 523 detects specific parameters from a signal transferred from the UMTS network 210 and maps the transferred signal into one appropriate for the CDMA network 250 on the basis of the detected parameters. Of course, the MAP conversion application 523 can also map a signal that is transferred from the CDMA network 250 to the UMTS network 210 in the opposite direction. In this case, the signal from the CDMA network 250 will be transferred in the opposite order to that of the foregoing path as described above.

Consequently, the RGW 230 analyzes the MAP-prepare-handover request message of the UMTS MAP standard to detect the MIN of the DBDM user terminal (WCDMA) 200 therefrom, and generates the ISPAGE2 Request message of the CDMA MAP standard including the detected MIN. As stated previously with reference to Table I, the IMSI is included in the MAP-prepare-handover request message, and only the MIN of the MCC, MNC and MIN constituting the IMSI is inserted in the ISPAGE2 Request message. Here, the ISPAGE2 Request message includes target cell information and a calling number, or MIN, of the DBDM user terminal (WCDMA) 200. The format of the ISPAGE2 Request message will hereinafter be described with reference to Table II, as follows:

TABLE II

| Parameter name | Request |
| --- | --- |
| Billing ID | 0 |
| MIN | M |
| ESN | 0 |

TABLE II-continued

| Parameter name | Request |
|---|---|
| LocationAreaID | 0 |
| PGEIND | 0 |
| ALRTCODE | 0 |
| MDN | 0 |
| CNIdigitsASCII | 0 |
| CNIsubaddressInfo | 0 |

As seen from Table II, the ISPAGE2 Request message includes a plurality of parameters. In an embodiment of the present invention, the MIN, which is a parameter of the ISPAGE2 Request message, is set as a mandatory parameter.

If the MSC 257 receives the ISPAGE2 request message from the RGW 230, then it sends a paging request message to the BSC 255 to which the DBDM user terminal (CDMA) 200 corresponding to the MIN belongs (step 423). Here, the paging request message is a general paging request message used in the CDMA network 250. The BSC 255 performs a paging procedure with the DBDM user terminal (CDMA) 200 in response to the paging request message (step 425). In an embodiment of the present invention, the paging procedure is a paging procedure generally performed in the CDMA network 250, which includes transmitting a paging indicator (PI) over a PICH (paging indication channel) and then transmitting actual paging information over a PCH (paging channel) after a predetermined period of time from the transmission of the PICH. Upon completing the paging procedure with the DBDM user terminal (CDMA) 200, the BSC 255 sends a paging response message indicative of the paging procedure completed state to the MSC 257 (step 427). If the MSC 257 receives the paging response message from the BSC 255, then it sends an inter-system page 2 (referred to hereinafter as "ISPAGE2") response message to the RGW 230 (step 429).

The format of the ISPAGE2 Response message will hereinafter be described with reference to Table III, as follows:

TABLE III

| Parameter name | Request |
|---|---|
| Invoke Id | 0 |
| AUTHR | 0 |
| COUNT | 0 |
| RAND | 0 |
| RANDC | 0 |
| SYSCAP | 0 |
| SYSACCTYPE | 0 |

As seen from Table III, the ISPAGE2 response message includes a plurality of parameters which are used to indicate that the DBDM user terminal (CDMA) 200 is ready to hand over to the MSC 257.

The RGW 230 analyzes the ISPAGE2 response message of the CDMA MAP standard received from the MSC 257, converts it into a MAP-prepare-handover response message of the UMTS MAP standard as a result of the analysis, and then transfers the converted message to the UMSC 217 (step 431). Here, the MAP-prepare-handover response message is a response message to the MAP-prepare-handover request message, and in one embodiment of the present invention, need not include separate parameters when being sent, if no authentication procedure is required.

Up to this point in the description, the RGW 230 has been shown to map between a MAP conversion protocol stack for mapping between messages of an integrated services digital network (ISDN) user part (referred to hereinafter as "ISUP") standard and messages of the CDMA MAP standard will hereinafter be described with reference to FIG. 6.

Figure 6:
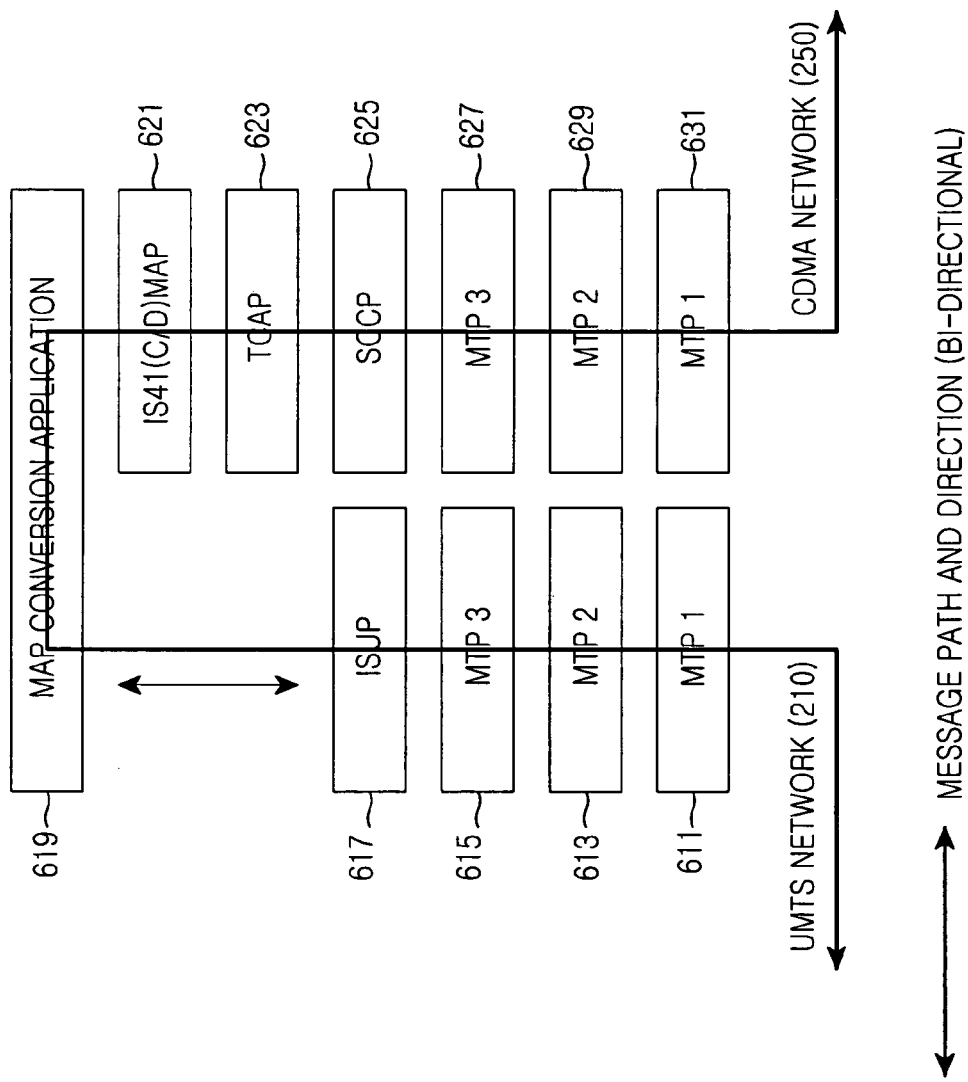
FIG. 6 is a block diagram schematically showing the structure of an ISUP/CDMA MAP standard conversion protocol stack of the roaming gateway in FIG. 2.

FIG. 6 is a block diagram schematically showing the structure of the MAP conversion protocol stack for conversion between the ISUP standard and CDMA MAP standard in the roaming gateway 230 in FIG. 2.

With reference to FIG. 6, an incoming message from the UMTS network 210 is first transferred to an MTP 1 611. Here, the MTP is a protocol layer of an SS7 having three layers, an MTP 1, MTP 2 and MTP 3 layer. The MTP 1 611 is a layer defining physical, electrical and functional characteristics of a digital signaling link. The MTP 1 611 transfers the incoming message to an MTP 2 613, which then transfers the message from the MTP 1 611 to an MTP 3 615. Here, the MTP 2 613 is an SS7 data link protocol layer, which acts to control the flow of input/output signals thereof and perform message sequence validation, error checking and retransmission with respect to input/output messages thereof. The MTP 3 615 transmits and receives messages between signaling points in the SS7 network and supports traffic control when message congestion or failure occurs. The MTP 3 615 transfers the message from the MTP 2 613 to an ISUP 617. Here, the ISUP 617 defines a communication protocol for transmission and reception of control signals and data between the user and the ISDN. The communication protocol defined by the ISUP 617 is used to perform call associated control operations, such as a call setup or release using various circuits of the ISDN, and additional-service control operations. The ISUP 617 transfers the message from the MTP 3 615 to a MAP conversion application 619. The MAP conversion application 619 maps the message transferred from the ISUP 617 so that it is conformable to the CDMA MAP standard, and then transfers the resulting message to an IS41(C/D) MAP 621. In an embodiment of the present invention, the MAP conversion procedure of the MAP conversion application 619 includes detecting a message of the CDMA network 250 corresponding to an ISUP message transferred from the UMTS network 210, and inserting specific parameters in the detected message of the CDMA network 250. The operation of the MAP conversion application 619 will be described below in greater detail.

The IS41(C/D) MAP 621 transfers the message from the MAP conversion application 619 to a TCAP 623, which then transfers the message from the IS41(C/D) MAP 621 to an SCCP 625. Here, the TCAP 623 acts to transmit and receive information between applications using non-circuit related signals in a PCS. The SCCP 625 can operate routing and data transmission without any logical signaling connection. The SCCP 625 transfers the message from the TCAP 623 to an MTP 3 627, which then transfers the message from the SCCP 625 to an MTP 2 629. The MTP 2 629 transfers the message from the MTP 3 627 to an MTP 1 631, which then transfers the message from the MTP 2 629 to the CDMA network 250. In an embodiment of the present invention, the mapping between the ISUP standard and the CDMA MAP standard is actually carried out by the MAP conversion application 619. The MAP conversion application 619 detects specific parameters from a message of the ISUP standard transferred from the UMTS network 210 and maps the transferred message into one appropriate to the CDMA network 250 on the basis of the detected parameters. Of course, the MAP conversion application 619 can also map a message that is transferred from the CDMA network 250 to the UMTS network 210 in the opposite direction. In this case, the message from the CDMA network 250 will be transferred in the opposite order to that of the foregoing path, as described above.

Upon receiving the MAP-prepare-handover response message from the RGW 230, the UMSC 217 recognizes that the DBDM user terminal (CDMA) 200 is ready to hand over to the CDMA network 250, and sends an initial address message (referred to hereinafter as "IAM") to the RGW 230 (step 433) (see FIG. 4B). Here, the IAM is an ISUP message, which is used to transfer a destination address from a serving MSC to a target MSC to set up an actual traffic path. The RGW 230 receives the IAM sent from the UMSC 217 and detects a MIN and a circuit identity code (referred to hereinafter as "CIC") contained in the received IAM. The RGW 230 then incorporates the MIN and CIC detected from the IAM of the ISUP standard in an inter-system setup (referred to hereinafter as "ISSETUP") request message of the CDMA MAP standard and sends the resulting ISSETUP request message to the MSC 257 (step 435). Upon receiving the ISSETUP request message, the MSC 257 detects the CIC incorporated in the received message. The MSC 257 then sends an assignment request message to the BSC 255 to which the DBDM user terminal (CDMA) 200 belongs, to request the BSC 255 to assign a traffic channel to the DBDM user terminal (CDMA) 200 (step 437). At this time, the MSC 257 generates the assignment request message to the BSC 255 on the basis of the CIC detected from the ISSETUP request message. The BSC 255 receives the assignment request message from the MSC 257 and then assigns the traffic channel to the DBDM user terminal (CDMA) 200. After completing the assignment of the traffic channel to the DBDM user terminal (CDMA) 200, the BSC 255 sends an assignment complete message indicative of the traffic channel assignment completed state to the MSC 257 (step 439). Upon receiving the assignment complete message from the BSC 255, the MSC 257 recognizes that the traffic channel assignment to the DBDM user terminal (CDMA) 200 has been completed, and then sends an inter-system setup (referred to hereinafter as "ISSETUP") response message to the RGW 230 (step 441). The ISSETUP Response message represents that a normal voice data path has been set up between the MSC 257 and the DBDM user terminal (CDMA) 200 in the CDMA mode.

After sending the ISSETUP Request message, the RGW 230 sends an address complete message (referred to hereinafter as "ACM") to the UMSC 217 (step 443). The ACM is an ISUP message, which is a kind of response message that a target MSC sends to a serving MSC to indicate that it has normally received an IAM sent from the serving MSC. Upon receiving the ACM, the UMSC 217 sends a RANAP relocation command message to the RNC 215 (step 445). The RGW 230 then sends a MAP-process access-signaling request message to the UMSC 217 (step 447). In an embodiment of the present invention, a MAP-process access-signaling service is a service for transferring information received through an Iu interface between the arbitrary second MSC and the arbitrary first MSC. In this regard, the MAP-process access-signaling request message is used to indicate the type of a protocol of the Iu interface, for example, a global system for mobile (GSM) or UMTS type. Notably, since the CDMA network 250 does not use the GSM or UMTS mode, the RGW 230 sets and sends version information indicative of the Iu interface protocol type as a default.

In step 448, the RGW 230 sends a MAP-send-end-signal request message to the UMSC 217. In an embodiment of the present invention, a MAP-send-end-signal service is a service where the arbitrary second MSC, or the MSC 257, notifies the arbitrary first MSC, or the UMSC 217, that it has set up a radio path to the DBDM user terminal (CDMA) 200. In this connection, the MAP-send-end-signal request message is used to notify the UMSC 217 that the radio path has been set up to the DBDM user terminal (CDMA) 200.

Upon completing a call setup procedure based on the CDMA mode with the DBDM user terminal (CDMA) 200 (step 449), the BSC 255 sends to the MSC 257 an answer (connection) message indicating that a connection setup has been completed with the call setup procedure completed (step 451). The MSC 257 receives the answer (connection) message and sends an inter-system answer (referred to hereinafter as "ISANSWER") request message to the RGW 230 (step 453). The ISANSWER request message includes the MIN and CIC. If the RGW 230 receives the ISANSWER request message of the CDMA MAP standard, then it analyzes the received message, converts it into an ANSWER message of the ISUP standard as a result of the analysis, and sends the converted message to the UMSC 217 (step 455). Upon receiving the ANSWER message, the UMSC 217 recognizes that a CDMA call setup with the DBDM user terminal (CDMA) 200 has been completed. As a result, the UMSC 217 sends a RANAP relocation command complete message to the RNC 215 (step 459). Upon receiving the RANAP relocation command complete message, the RNC 215 recognizes that the CDMA call setup with the DBDM user terminal (CDMA) 200 has been completed, and then sends a WCDMA call release message to the DBDM user terminal (WCDMA) 200 to release a currently set-up call based on the WCDMA mode (step 461). If the DBDM user terminal (WCDMA) 200 receives the WCDMA call release message, then it releases the WCDMA call currently set up with the WCDMA network 210.

The UMSC 217 sends a RELEASE message indicating that the WCDMA call has been released, to the RGW 230 as well as to the DBDM user terminal (WCDMA) 200 (step 463). The UMSC 217 also sends a MAP-send-end-signal response message, which is a response message to the MAP-send-end-signal request message, to the RGW 230 (step 465).

The operations of the MAP conversion applications will hereinafter be described with reference to FIG. 7.

Figure 7:
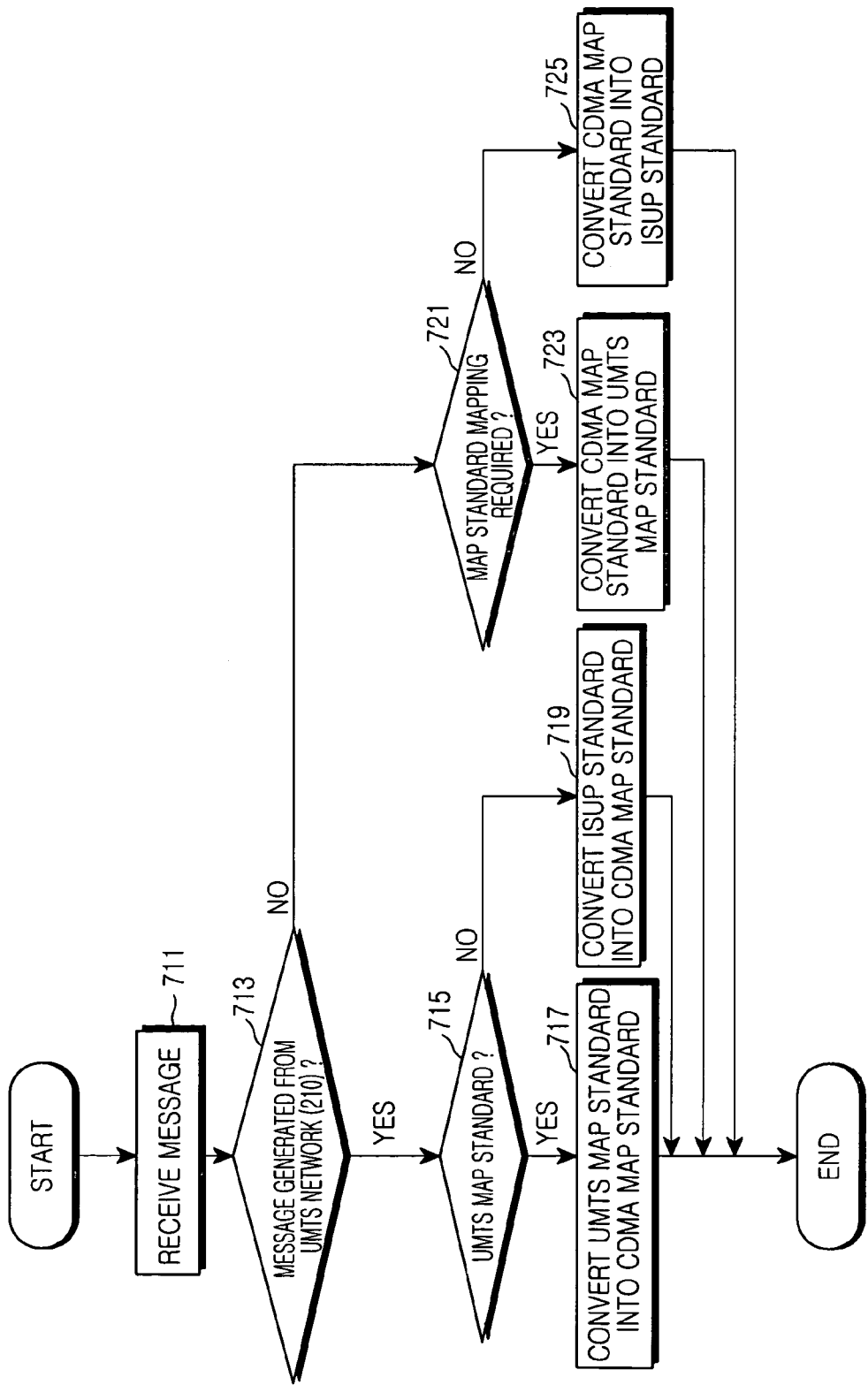
FIG. 7 is a flow chart illustrating the operations of MAP conversion applications in FIGS. 5 and 6.

FIG. 7 is a flow chart illustrating the operations of the MAP conversion applications in FIGS. 5 and 6.

Note that the MAP conversion application 523 shown in FIG. 5 and the MAP conversion application 619 shown in FIG. 6 are substantially the same with the exception that they are denoted by different reference numerals. With reference to FIG. 7, upon receiving a message at step 711, the MAP conversion application (523 or 619) proceeds to step 713. At decision step 713, the MAP conversion application determines whether the received message is one generated from the UMTS network 210. If the received message is determined to be one generated from the UMTS network 210 ("Yes" path from decision step 713), the MAP conversion application proceeds to decision step 715. At decision step 715, the MAP conversion application determines whether the received message is a UMTS MAP standard message. Upon determining that the received message is a UMTS MAP standard message ("Yes" path from decision step 715), the MAP conversion application proceeds to step 717. At step 717, the MAP conversion application converts the UMTS MAP standard message into a CDMA MAP standard message, or IS41 C/D MAP standard message, and then ends its operation.

If, however, it is determined at decision step 715 that the received message is not a UMTS MAP standard message ("No" path from decision step 715), the MAP conversion application proceeds to step 719. Here, the fact that the received message is not a UMTS MAP standard message signifies that the received message is an ISUP standard message. At step 719, the MAP conversion application converts the ISUP standard message into an IS41 C/D MAP standard message and then ends its operation.

If, however it is determined at decision step 713 that the received message is not one generated from the UMTS network 210 ("No" path from decision step 713), the MAP conversion application proceeds to decision step 721. Here, the fact that the received message is not one generated from the UMTS network 210 signifies that the received message is one generated from the CDMA network 250, as discussed above. At decision step 721, the MAP conversion application analyzes the received message to determine whether a MAP standard conversion operation is required for the received message. In an embodiment of the present invention, the MAP conversion application can verify the identity of the received message with only a message identification (ID) thereof. All ISUP messages or MAP messages include message IDs, and the MAP conversion application can discriminate from the message ID of the received message whether the received message is an ISUP message or MAP message. Upon determining at decision step 721 that the MAP standard conversion operation is required for the received message ("Yes" path from decision step 721), the MAP conversion application proceeds to step 723. At step 723, the MAP conversion application converts the CDMA MAP standard message into a UMTS MAP standard message and then ends its operation.

If, however, it is determined at decision step 721 that the MAP standard conversion operation is not required for the received message ("No" path from decision step 721), the MAP conversion application proceeds to step 725. Here, the fact that the MAP standard conversion operation is not required for the received message signifies that an ISUP standard conversion operation is required for the received message. At step 725, the MAP conversion application converts the CDMA MAP standard message into an ISUP standard message and then ends its operation.

As apparent from the above description, the embodiments of the present invention provides a system and method for performing a handover between networks with different communication modes using an inter-system paging procedure without separate radio interface modifications. In the case of constructing a network employing a new communication mode, it is possible to address a handover problem between that network and a network employing an existing communication mode, resulting in the advantage of improving the quality of a communication system. In particular, the evolution from an existing 2G network to a 3G network necessitates a handover between the 2G network and the 3G network. In this case, according to the embodiments of the present invention, there is no need to construct a separate system for the handover, thus making it possible to increase the efficiency of resource distribution, too.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for handing over a terminal from a first base station to a second base station in a mobile communication system while the terminal is in communication with the first base station, wherein said mobile communication system includes said first base station for providing a communication service in a first communication mode, a first base station controller connected with said first base station and a first mobile switching center, said second base station for providing a communication service in a second communication mode, said second communication mode being different from said first communication mode, a second base station controller connected with said second base station and a second mobile switching center, and a roaming gateway for performing a standard conversion operation with respect to messages transmitted and received between said first mobile switching center and said second mobile switching center, and wherein said method comprises:

a) controlling said terminal by said first base station controller such that said terminal performs an initialization operation based on said second communication mode with said second base station, upon determining that said terminal must hand over to said second base station;

b) notifying said first mobile switching center by said first base station controller that said terminal has completed said second communication mode-based initialization operation, if said terminal completes said second communication mode-based initialization operation with said second base station;

c) notifying said second mobile switching center by said first mobile switching center, via said roaming gateway that said terminal must hand over to said second base station;

d) controlling said second base station controller by said second mobile switching center such that said second base station pages said terminal;

e) notifying said first mobile switching center by said second mobile switching center via said roaming gateway that said terminal is ready to hand over to said second base station, upon recognizing that said second base station controller has completed the paging of said terminal;

f) controlling said second mobile switching center by said roaming gateway, such that said second base station controller sets up a call with said terminal, as said terminal is ready to hand over to said second base station;

g) notifying said first mobile switching center by said second mobile switching center via said roaming gateway that the call setup with said terminal has been completed, upon recognizing that said second base station controller has completed said call setup with said terminal; and h) controlling said first base station controller by said first mobile switching center to cause said first base station controller to release current communication of said terminal with said first base station, as said call setup with said terminal is completed.

2. The method as set forth in claim 1, wherein said first mobile switching center is adapted to send a message including an international mobile subscriber identity of said terminal to said roaming gateway to notify said second mobile switching center that said terminal must hand over to said second base station.

3. The method as set forth in claim 2, wherein said roaming gateway is adapted to send a message including only a mobile identification number of said international mobile subscriber identity of said terminal to said second mobile switching center to notify said second mobile switching center that said terminal must hand over to said second base station.

4. The method as set forth in claim 2, wherein said roaming gateway is adapted to send a message including said mobile identification number and a circuit identity code to said second mobile switching center to control said second mobile switching center such that said second base station controller sets up said call with said terminal.

5. The method as set forth in claim 1, wherein said first base station controller is adapted to determine that said terminal must hand over to said second base station, when neighbor cell information of said terminal is insufficient.

6. The method as set forth in claim 1, wherein said roaming gateway is adapted to perform standard mapping between said first communication mode of said first mobile switching center and said second communication mode of said second mobile switching center.

7. The method as set forth in claim 1, wherein said first communication mode is an asynchronous communication mode and said second communication mode is a synchronous communication mode.

8. A system for handing over a terminal from a first base station to a second base station in a mobile communication system while the terminal is in communication with the first base station, said first base station providing a communication service in a first communication mode, said second base station providing a communication service in a second communication mode, said second communication mode being different from said first communication mode, said system comprising:

a first base station controller for controlling said terminal upon determining that said terminal must hand over to said second base station, such that said terminal performs an initialization operation based on said second communication mode with said second base station, notifying a first mobile switching center that said terminal has completed said second communication mode-based initialization operation, upon recognizing that said terminal has completed said second communication mode-based initialization operation, and then releasing a call currently set up with said terminal if said terminal hands over to said second base station;

said first mobile switching center for notifying a second mobile switching center to which said second base station belongs, via a roaming gateway, that said terminal must hand over to said second base station, upon recognizing that said terminal has completed said second communication mode-based initialization operation, and then controlling said first base station controller to release said call currently set up with said terminal, upon recognizing that said terminal is ready to hand over to said second base station;

said second mobile switching center for controlling a second base station controller to which said second base station is connected if said second mobile switching center is notified that said terminal must hand over to said second base station, such that said second mobile switching center pages said terminal, notifying said first mobile switching center via said roaming gateway that said terminal is ready to hand over to said second base station, upon recognizing that said second base station controller has completed the paging of said terminal, and then notifying said first mobile switching center via said roaming gateway that a second communication mode-based call setup with said terminal has been completed, upon recognizing that said second base station controller has completed the call setup with said terminal according to a predetermined control;

said second base station controller for paging said terminal under the control of said second mobile switching center and performing said call setup with said terminal after completing the paging of said terminal; and said roaming gateway for performing a standard conversion operation with respect to messages transmitted and received between said first mobile switching center and said second mobile switching center.

9. The system as set forth in claim 8, wherein said roaming gateway is adapted to detect a standard of an incoming message from said first mobile switching center or said second mobile switching center and, if the detected standard is different from that of said second or first mobile switching center to which said message is to be transferred, map said standard of said message to be conformable to said standard of said second or first mobile switching center to which said message is to be transferred.

10. The system as set forth in claim 8, wherein said first mobile switching center is adapted to send a message including an international mobile subscriber identity of said terminal to said roaming gateway to notifysaid second mobile switching center that said terminal must hand over to said second base station.

11. The system as set forth in claim 10, wherein said roaming gateway is adapted to send a message including only a mobile identification number of said international mobile subscriber identity of said terminal to said second mobile switching center to notify said second mobile switching center that said terminal must hand over to said second base station.

12. The system as set forth in claim 10, wherein said roaming gateway is adapted to send a message including said mobile identification number and a circuit identity code to said second mobile switching center to control said second mobile switching center such that said second base station controller performs said call setup with said terminal.

13. The system as set forth in claim 8, wherein said first base station controller is adapted to determine that said terminal must hand over to said second base station, when neighbor cell information of said terminal is insufficient.

14. The system as set forth in claim 8, wherein said first communication mode is an asynchronous communication mode and said second communication mode is a synchronous communication mode.

* * * * *